US011252422B2

(12) United States Patent
Suehring et al.

(10) Patent No.: US 11,252,422 B2
(45) Date of Patent: *Feb. 15, 2022

(54) NETWORK DEVICE AND ERROR HANDLING

(71) Applicant: GE Video Compression, LLC, Albany, NY (US)

(72) Inventors: Karsten Suehring, Berlin (DE); Thomas Schierl, Berlin (DE); Detlev Marpe, Berlin (DE); Robert Skupin, Berlin (DE); Yago Sanchez De La Fuente, Berlin (DE); Gerhard Tech, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,761

(22) Filed: Apr. 26, 2019

(65) Prior Publication Data

US 2019/0253725 A1 Aug. 15, 2019

Related U.S. Application Data

(63) Continuation of application No. 14/995,260, filed on Jan. 14, 2016, now Pat. No. 10,349,065, which is a
(Continued)

(51) Int. Cl.
*H04N 19/66* (2014.01)
*H04N 19/30* (2014.01)
(Continued)

(52) U.S. Cl.
CPC .......... *H04N 19/30* (2014.11); *H04L 69/324* (2013.01); *H04N 19/119* (2014.11);
(Continued)

(58) Field of Classification Search
CPC .. H04L 69/324; H04N 19/119; H04N 19/166; H04N 19/174; H04N 19/187;
(Continued)

(56) References Cited

U.S. PATENT DOCUMENTS 9,912,966 B2 3/2018 Hannuksela
10,142,639 B2 11/2018 Suehring et al.
(Continued)

FOREIGN PATENT DOCUMENTS

CN 1483289 3/2004
CN 1759384 A 4/2006
(Continued)

OTHER PUBLICATIONS

Office Action issued in corresponding Chinese Patent Application No. 201910182087.1 dated Jan. 27, 2021.
(Continued)

*Primary Examiner* — William C Vaughn, Jr.
*Assistant Examiner* — Naod W Belai
(74) *Attorney, Agent, or Firm* — Morgan, Lewis & Bockius LLP

(57) ABSTRACT

A number of negatively affected (correctly received) packets due to packet loss is reduced by providing, and analyzing, error resilience in the packets of the sequence of packets and identifying, for each of runs of one or more lost packets of the sequence of packets, a first packet in the sequence of packets after the respective run of one or more lost packets, which carries a beginning of any of the tiles of the video data stream, and concurrently carries a slice, the slice header of which is contained in any of the packets of the sequence of packets not being lost. In particular, the side information overhead for transmitting the error resilience data is comparatively low compared to the reduction in negatively affected packets due to packet loss.

17 Claims, 8 Drawing Sheets

Related U.S. Application Data continuation of application No. PCT/EP2014/065184, filed on Jul. 15, 2014.

(60) Provisional application No. 61/846,479, filed on Jul. 15, 2013.

(51) Int. Cl.

| | | |
|---|---|---|
| *H04N 19/65* | (2014.01) | |
| *H04N 19/70* | (2014.01) | |
| *H04L 29/08* | (2006.01) | |
| *H04N 19/187* | (2014.01) | |
| *H04N 19/423* | (2014.01) | |
| *H04N 19/44* | (2014.01) | |
| *H04N 19/50* | (2014.01) | |
| *H04N 19/85* | (2014.01) | |
| *H04N 19/119* | (2014.01) | |
| *H04N 19/166* | (2014.01) | |
| *H04N 19/174* | (2014.01) | |
| *H04N 19/593* | (2014.01) | |
| *H04N 19/89* | (2014.01) | |
| *H04N 19/91* | (2014.01) | |
| *H04N 19/33* | (2014.01) | |

(52) U.S. Cl.
  CPC ......... *H04N 19/166* (2014.11); *H04N 19/174* (2014.11); *H04N 19/187* (2014.11); *H04N 19/33* (2014.11); *H04N 19/423* (2014.11); *H04N 19/44* (2014.11); *H04N 19/50* (2014.11); *H04N 19/593* (2014.11); *H04N 19/65* (2014.11); *H04N 19/66* (2014.11); *H04N 19/70* (2014.11); *H04N 19/85* (2014.11); *H04N 19/89* (2014.11); *H04N 19/91* (2014.11)

(58) Field of Classification Search
  CPC ...... H04N 19/30; H04N 19/33; H04N 19/423; H04N 19/44; H04N 19/50; H04N 19/593; H04N 19/65; H04N 19/66; H04N 19/70; H04N 19/85; H04N 19/89; H04N 19/91
  USPC .................................................. 375/240.27
  See application file for complete search history.

(56) References Cited

U.S. PATENT DOCUMENTS

| | | | |
|---|---|---|---|
| 10,349,065 | B2 | 7/2019 | Suehring et al. |
| 10,425,651 | B2 | 9/2019 | Suehring et al. |
| 10,595,027 | B2 | 3/2020 | Suehring et al. |
| 10,609,399 | B2 | 3/2020 | Suehring et al. |
| 2002/0080802 | A1 | 6/2002 | Sachs et al. |
| 2005/0147053 | A1 | 7/2005 | Saito |
| 2006/0168517 | A1 | 7/2006 | Itoh et al. |
| 2007/0110150 | A1 | 5/2007 | Wang et al. |
| 2008/0007438 | A1 | 1/2008 | Seagall et al. |
| 2008/0031347 | A1 | 2/2008 | Segall |
| 2008/0036854 | A1 | 2/2008 | Elliott et al. |
| 2008/0165855 | A1 | 7/2008 | Wang et al. |
| 2009/0125636 | A1 | 5/2009 | Li et al. |
| 2009/0175353 | A1 | 7/2009 | Suh et al. |
| 2009/0225870 | A1 | 9/2009 | Narasimhan |
| 2010/0246816 | A1 | 9/2010 | Thomas et al. |
| 2012/0147140 | A1 | 7/2012 | Itakura et al. |
| 2012/0183060 | A1 | 7/2012 | Hong et al. |
| 2012/0183077 | A1 | 7/2012 | Hong |
| 2013/0028316 | A1 | 1/2013 | Leontaris et al. |
| 2013/0101035 | A1* | 4/2013 | Wang .................... H04N 19/70 375/240.12 |
| 2013/0176387 | A1 | 7/2013 | Suh et al. |
| 2014/0003489 | A1 | 1/2014 | Hannuksela |
| 2014/0092994 | A1 | 4/2014 | Wang |
| 2014/0301451 | A1 | 10/2014 | Deshpande |
| 2014/0301477 | A1 | 10/2014 | Deshpande |
| 2014/0334557 | A1 | 11/2014 | Schierl et al. |
| 2015/0003474 | A1* | 1/2015 | Thomas .................. H04L 69/22 370/474 |
| 2015/0023409 | A1 | 1/2015 | Schierl et al. |
| 2015/0208095 | A1* | 7/2015 | Schierl .................. H04N 19/70 375/240.28 |
| 2015/0271507 | A1 | 9/2015 | Hendry et al. |
| 2016/0014430 | A1 | 1/2016 | Hinz et al. |
| 2016/0057441 | A1 | 2/2016 | Skupin et al. |
| 2016/0080755 | A1 | 3/2016 | Toma |
| 2016/0134895 | A1 | 5/2016 | Suehring |
| 2016/0156936 | A1 | 6/2016 | Suehring |
| 2020/0145678 | A1 | 5/2020 | Suehring |

FOREIGN PATENT DOCUMENTS

| | | |
|---|---|---|
| CN | 101317460 | 12/2008 |
| CN | 101543018 | 9/2009 |
| CN | 102484561 | 5/2012 |
| CN | 102714725 | 10/2012 |
| CN | 103096078 | 5/2013 |
| EP | 2587804 A1 | 5/2013 |
| JP | 2000078197 | 3/2000 |
| JP | 2001203749 | 7/2001 |
| JP | 2010516085 | 5/2010 |
| JP | 2012010066 | 1/2012 |
| KR | 10-2010-0119002 | 11/2010 |
| KR | 1020140131926 A | 11/2014 |
| KR | 1020150029723 A | 3/2015 |
| KR | 101930817 B1 | 12/2018 |
| KR | 10-2067231 B1 | 7/2020 |
| KR | 10-2162120 B1 | 10/2020 |
| KR | 10-2249228 B1 | 5/2021 |
| WO | 2008085433 | 7/2008 |
| WO | 2008156548 | 10/2008 |
| WO | 2009111519 | 9/2009 |
| WO | 2011161922 | 12/2011 |
| WO | 2012/096981 A1 | 7/2012 |
| WO | 2013027407 | 2/2013 |
| WO | 2013063094 A1 | 5/2013 |

OTHER PUBLICATIONS

Decision to Grant a Patent issued in corresponding Korean Patent Application No. 10-2020-70000920 dated Jan. 29, 2021, with English translation.
Office Action issued in corresponding Chinese Patent Application No. 201910310534.7 dated Jan. 27, 2021.
Decision to Grant a Patent issued in corresponding Korean Patent Application No. 10-2020-7027744 dated Jan. 29, 2021, with English translation.
Office Action dated Aug. 4, 2020 in Japanese Application 2018-233051.
Decision to Grant dated Oct. 6, 2020 in Japanese Patent Application 2019-075436.
Office Action dated Oct. 22, 2020 in European Application 14744010.1.
Office Action dated Jun. 11, 2020 in U.S. Appl. No. 16/738,075.
Office Action dated Jun. 25, 2020 in U.S. Appl. No. 16/552,342.
Office Action dated Jul. 28, 2020 in U.S. Appl. No. 16/795,655.
Notice of Allowance dated Aug. 7, 2020 in U.S. Appl. No. 16/802,620.
Notice of Allowance dated Oct. 9, 2019 in U.S. Appl. No. 14/995,244.
Kyungmo PARK et al., Working Draft of MPEG Media Transport, International Organisation for Standardisation, ISO/IEC JTC1/SC29/WG11/N12169, Jul. 2011, Torino, Italy.
Notice of Allowance dated Nov. 20, 2019 in U.S. Appl. No. 16/460,230.
Notice of Allowance dated Nov. 27, 2019 in U.S. Appl. No. 16/377,449.
Office Action issue in corresponding Japanese Patent Application No. 2018-233051 dated Mar. 2, 2021, with English Translation.
Office Action dated Jan. 8, 2020 in European Patent Application 19185269.8.

(56) References Cited

OTHER PUBLICATIONS

Office Action dated Jan. 20, 2020 in European Patent Application 19185282.1.
Office Action dated Jan. 7, 2020 in Japanese Application 2018-233051.
Appeal Decision dated Feb. 18, 2020 in Japanese Application 2016-526589.
Office Action dated Feb. 27, 2020 in Korean Application 10-2020-7000840.
Office Action dated Feb. 28, 2020 in Korean Application 10-2020-7000920.
Office Action dated Mar. 2, 2020 in Chinese Application 201480050665.1.
Summons to Attend Oral Proceedings dated Mar. 16, 2020 in European Application 14744 010.1.
Office Action dated Feb. 18, 2020 in Japanese Application 2018-121768.
Office Action dated Feb. 18, 2020 in Japanese Application 2018-121752.
Summons to Attend Oral Proceedings dated Mar. 2, 2020 in European Application 14741559.0.
Notice of Issuance dated Jun. 30, 2020 in Chinese Application 201480050665.1.
Decision to Grant dated Jun. 28, 2020 in Korean Application 10-2018-7036223.
Decision to Grant dated Jun. 28, 2020 in Korean Application 10-2018-7033436.
G. Tech, et al. 3D/MV-HEVC HLS: Flexible layer clustering for extending the supported number of layers. JCT-VC of ITU-T and ISO/IEC. JCTVC-N0357 Ver.1, Jul. 25, 2013, pp. 1-9.
G. Tech, et al. 3D/MV-HEVC HLS: Dependency signaling for extending the supported number of layers. JCT-VC of ITU-T and ISO/IEC. JCTVC-N0356 Ver.1, Jul. 25, 2013, pp. 1-7.
Decision to Grant dated Jun. 28, 2020 in Korean Application 10-2018-7031313.
Decision to Grant dated Jul. 14, 2020 in Japanese Application 2018-121768.
Office Action issued in corresponding Korean Patent Application No. 10-2021-7006065 dated May 18, 2021, with English translation.
Decision to Grant Patent issued in corresponding Korean Patent Application No. 10-2020-7000840 dated Jul. 1, 2021, with English translation.
Notice of Issuance in corresponding Chinese Patent Application No. 201910310534.7 dated Jul. 6, 2021.
Shujuan Chang, "Wavelet Transform in Image Compression", Technology Innovation Forum, Jun. 23, 2010.
Office Action issued in corresponding Korean Patent Application No. 10-2021-7013229 dated Jul. 17, 2021, with English translation.
Priority application, U.S. Appl. No. 61/749,042, filed Jul. 15, 2013, 43 pages.
International Search Report, dated Oct. 8, 2014, from parallel International Patent Application No. PCT/EP2014/065181, 3 pages.
International Search Report, dated Aug. 22, 2014, from parallel International Patent Application No. PCT/EP2014/065182, 2 pages.
International Search Report, dated Oct. 29, 2014, from parallel International Patent Application No. PCT/EP2014/065183, 3 pages.
International Search Report, dated Oct. 23, 2014, from parallel International Patent Application No. PCT/EP2014/065184, 3 pages.
International Search Report, dated Aug. 19, 2014, from parallel International Patent Application No. PCT/EP2014/065185, 3 pages.
Bross, B., et al., "High Efficiency Video Coding (HEVC) text specification draft 10", JCTVC-L1003_v34, Geneva, CH, Jan. 14-23, 2013, 310 pages.
Tech, G., et al., "MV-HEVC Draft Text 3", JCT3V-C1004_d3, Geneva, CH, Jan. 17-23, 2013, 34 pages.
Tech, G., et al., "3D-HEVC Test Model description, draft specification", JCT3V-C1005_d0, Geneva, CH, Jan. 17-23, 2013, 142 pages.
Wilburn, B., et al., "High Performance Imaging Using Large Camera Arrays", ACM Transactions on Graphics, 2005, vol. 24, No. 3, pp. 765-776, 12 pages.
Wilburn, B., et al., "The Light Field Video Camera", Electronic Imaging 2002, International Society for Optics and Photonics, 2001, pp. 29-36, 8 pages.
Horimai, H., et al., "Full-Color 3D Display System with 360 Degree Horizontal Viewing Angle", Proc. Int. Symposium of 3D and Contents, 2010, pp. 7-10, 4 pages.
Suehring, K., et al., "MV-HEVC/SHVC HLS: Extending the supported number of layers", JCT3V-D0211_v1, Incheon, KR, Apr. 20-26, 2013, 7 pages.
Wang, Y.-K., et al., "Report of the joint BoG on high-level syntax", JCTVC-M0450_v5, Incheon, KR, Apr. 18-26, 2013, 33 pages.
Tech, G., et al., "3D/MV-HEVC HLS: Dependency signaling for extending the supported number of layers", JCT3V-E0223, Vienna, AT, Jul. 27-Aug. 2, 2013, 7 pages.
Tech, G., et al., "3D/MV-HEVC HLS: Flexible layer clustering for extending the supported number of layers", JCTVC-N0357, Vienna, AT, Jul. 25-Aug. 2, 2013, 9 pages.
Hendry, H., et al., "„AHG 9: On dependent slice, JCTVC-K0167, Shanghai, CN, Oct. 10-19, 2012, 4 pages.
Sjöberg, R., et al., "Overview of HEVC High-Level Syntax and Reference Picture Management", IEEE Trans. Circuits Syst. Video Technol., vol. 22, No. 12, pp. 1858-1870, 13 pages.
Ruijin, F., et al., "Scalable Layered MPEG-2 Video Multicast Architecture", IEEE Trans. Consumer Electronics, vol. 47, No. 1, pp. 55-62, 8 pages.
Li, H., et al., "Adaptive Reed-Solomon Code Protection of Data Partitioned H.264 Video", Proc. 5th IEEE Int. Conf. Intelligent Information Hiding and Multimedia Signal Processing, 2009, pp. 122-127, 6 pages.
Choi, B., et al., "Layer identifier extension for MV-HEVC and other HEVC extension", JCT3V-D0238, Incheon, KR, Apr. 20-26, 2013, 3 pages.
Suehring, K., et al., "Ultra-low delay multi-layer decoding by interleaving of decoding units in SHVC and 3D/MV-HEVC", JCTVC-M0204, Incheon, KR, Apr. 18-26, 2013, 6 pages.
Kazui, K., et al., "AHG9: Improvement of HRD for sub-picture based operation", JCTVC-J0136, Stockholm, SE, Jul. 11-20, 2012, 10 pages.
Skupin, R., et al., "Ultra-low delay with SHVC, MV-HEVC and 3DHEVC", JCT3V-E0098, Vienna, AT, Jul. 27-Aug. 2, 2013, 5 pages.
Office Action dated Jul. 9, 2019 in Japanese Application 2018-121752.
Office Action dated Jul. 9, 2019 in Japanese Application 2018-121768.
Suehring Karsten et al., "3D/MV-HEVG HLS: Extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Suehring K et al: "3D/MV-HEVG HLS: Extending the supported number of layers", Joint Collaborative Team on 3D Video Coding Extensions of ITU-T SG16 WP3 and ISO/IEC JTC1/SC29/W11, 4th Meeting, Incheon, KR Apr. 20-26, 2013.
Suehring Karsten et al., "3D/MV-HEVG HLS: Dependency signaling for extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Tech, Gerhard et al., "3D/MV-HEVC HLS: Flexible layer clustering for extending the supported number of layers", Joint Collaborative Team on 3D Video Coding Extensions, of ITU-T SG 16 WP 3 and ISO/IEC JTC 1/SC 29/WG 11, 5th Meeting: Vienna, AT, Jul. 27-Aug. 2, 2013.
Choi, Byeongdoo et al., "Layer identifier extension for MV-HEVC and other HEVC extension", Joint Collaborative Team on 3D Video Coding Extensions of ITU-T SG16 WP3 and ISO/IEC JTC1/SC29/W11, 4th Meeting, Incheon, KR Apr. 20-26, 2013.
Office Action issue in corresponding Korean Patent Application No. 10-2020-7000840 dated Feb. 23, 2021, with English Translation.

(56) References Cited

OTHER PUBLICATIONS

Office Action issue in corresponding Japanese Patent Application No. 2019-228823 dated Feb. 2, 2021, with English Translation.
Byeongdoo Choi et al., NAL unit header for scalable extension, Joint Collaborative Team on Video Coding (JCT-VC) of ITU-T SG 16 WP 3 and ISO/IEC JTC 1/SC 29/WG 11, 9th Meeting: Geneva, CH, Apr. 2012, JCTVC-I0132, 1-5.
Office Action dated Mar. 17, 2020 in Japanese Application 2019-075436.
Communication pursuant to Article 94(3) EPC issued in corresponding European Application No. 19 185 269.8 dated Apr. 30, 2021.
Communication pursuant to Article 94(3) EPC issued in corresponding European Application No. 19 185 282.1 dated Apr. 30, 2021.
Office Action dated Aug. 27, 2019 in Japanese Application 2016-526588.
Decision to Grant dated Oct. 11, 2019 in Korean Application 10-2018-7036575.
Decision to Grant dated Oct. 11, 2019 in Korean Application 10-2018-7031306.
Office Action dated Oct. 14, 2019 in Korean Application 10-2018-7033436.
Office Action dated Oct. 14, 2019 in Korean Application 10-2018-7031313.
Office Action dated Oct. 15, 2019 in Korean Application 10-2018-7036223.
Office Action dated Jan. 24, 2017 in Japanese Application 2016-526592.
Office Action dated Feb. 7, 2017 in Japanese Application 2016-526590.
Office Action dated Jan. 31, 2017 in Japanese Application 2016-526591.
Office Action dated Jan. 31, 2017 in European Application 14741559.0.
Choi B. et al., "Layer identifier extension", Joint Collaborative Team on Video Coding (JCT-VC) of ITU-T SG16 WP3 and ISO/IEC JTC1/SC29/WG11 13th Meeting: Incheon, KR, Apr. 18-26, 2013, [JCTVC-M0164].
Deshpande S. et al., "On Sub-picture Based CPB", Joint Collaborative Team on Video Coding (JCT-VC) of ITU-T SG16 WP3 and ISO/IEC JTC1/SC29/WG11 10th Meeting: Stockholm, SE, Jul. 11-20, 2012, U.S., JCTVC, Jul. 16, 2012, JCTVC-J0306, p .1-p .8, URL, http://phenix.it-sudparis.eu/jct/index.php.
Suehring K et al: "3D/MV-HEVG HLS: Study and proposal of methods for extending the supported number of layers", 15. JGT-VG Meeting; Oct. 23, 2013-Jan. 11, 2013; Geneva; (Joint Collaborative Team on Video Coding of ISO/IEG JTG1/SG29/WG11 ANO ITU-T SG.16 ); URL: http://wftp3.itu.int/av-arch/jctvc-site/,,No. JCTVC-00200, Oct. 15, 2013 (Oct. 15, 2013), XP030115242.
Office Action dated Feb. 28, 2017 in Japanese Application 2016-526588.
Office Action dated Feb. 28, 2017 in Japanese Application 2016-526589.
Office Action dated Mar. 1, 2018 in U.S. Appl. No. 14/995,222.
Notification of the First Office Action Chinese Patent Application No. 2014800506280 dated Jan. 26, 2018.
Non final Office Action U.S. Appl. No. 14/995,260 dated Mar. 28, 2018.
Non final Office Action U.S. Appl. No. 14/995,244 dated Apr. 3, 2018.
Non final Office Action U.S. Appl. No. 14/995,430 dated May 10, 2018.
Non-final Office Action U.S. Appl. No. 14/995,399 dated Jun. 11, 2018.
Notification of the First Office Action Chinese Patent Application No. 20148005066666 dated Apr. 3, 2018.
Notification of the First Office Action Chinese Patent Application No. 2014800506670 dated Apr. 3, 2018.
Notice of Allowance U.S. Appl. No. 14/995,222 dated Jul. 11, 2018.
Office Action Korean Patent Application No. 10-2016-7003788 dated Aug. 21, 2018.

K. Suehring, et al. 3D/MV-HEVC HLS: Extending the supported number of layers. JCT-VC of ITU-T and ISO/IEC. JCTVC-N0355 Ver.2, Jul. 30, 2013, pp. 1-8.
Decision to Grant a Patent Korean Patent Application No. 10-2016-7003789 dated Sep. 18, 2018.
Notice of Decision of Rejection Korean Patent Application No. 10-2016-7002764 dated Nov. 28, 2018.
Notification of the Second Office Action Chinese Patent Application No. 2014800506651 dated Dec. 12, 2018.
Non-final Office Action U.S. Appl. No. 16/157,723 dated Dec. 20, 2018.
Tiesong Zhao et al., Fast Inter-Layer Mode Decision in Scalable Video Coding, Proceedings of the 2010 IEEE 17th International Conference on Image Processing, Sep. 26-29, 2010, pp. 4221-4224.
Notice of Allowance U.S. Appl. No. 14/995,399 dated Jan. 9, 2019.
Final Office Action U.S. Appl. No. 14/995,244 dated Jan. 10, 2019.
Notice of Allowance U.S. Appl. No. 14/995,260 dated Jan. 31, 2019.
Decision to Grant a Patent dated Mar. 12, 2019 issued in corresponding Japanese Patent Application No. 2016-526591.
Office Action dated Jul. 29, 2019 in U.S. Appl. No. 16/377,449.
Office Action dated Aug. 5, 2019 in U.S. Appl. No. 16/460,230.
Notice of Allowance dated Nov. 19, 2019 in Japanese Application 2018-224107.
Notice of Issuance dated Dec. 16, 2019 in Chinese Application 201480050655.8.
Notification of the Third Office Action Chinese Patent Application No. 2014800506651 dated Jul. 3, 2019 with English translation.
Notification to Grant dated Jun. 4, 2019 issued in corresponding Chinese Patent Application No. 201480050628.0 with English translation.
Third Office Action dated Jun. 25, 2019 issued in corresponding Chinese Patent Application No. 201480050655.8 with English translation.
Notification of Reasons for Refusal Japanese Patent Application No. 2018-008825 dated Jul. 2, 2019 with English translation.
Notice of Allowance U.S. Appl. No. 16/157,723 dated Apr. 3, 2019.
Non-final Office Action U.S. Appl. No. 14/995,244 dated May 1, 2019.
Notice of Allowance U.S. Appl. No. 14/995,430 dated May 22, 2019.
NPL Internet Google Search Apr. 27, 2019—www.google.com/search?rlv=1C1GCEA_enUS798US799&biw=1229&bih=651&tbs=cdr%3A1%2Ccd_max%3a7%2F14%2f2013&ei=z7 . . . . 2 pages.
T. Schierl et al., "System Layer Integration of High Efficiency Video Coding" IEEE Transactions on circuits and Systems for Video Technology, vol. 22, No. 12, Dec. 2012, pp. 1871-1884.
Kyungmo Park et al., International Organisation for Standardisation Organization Internationale De Normalisation ISO/IEC JTC1/SC29/WG11 Codin GOF Moving Pictures and Audio, Jul. 2011, Torino Italy.
Gary J. Sullivan et al., "Overview of the High Efficiency Video Coding (HEVC) Standard", IEEE Transactions on circuits and Systems for Video Technology, vol. 22, No. 12, Dec. 2012, pp. 1649-1665.
Notice of Issuance issued in corresponding Chinese Patent Application No. 2019101820871 dated Aug. 5, 2021.
Office Action issued in corresponding Japanese Patent Application No. 2020-104959 dated Jul. 20, 2021.
Office Action issued in corresponding Japanese Patent Application No. 2018-121752 (Appeal No. 2020-008460) dated Aug. 3, 2021, with English translation.
Notice of Allowance issued in corresponding Japanese Patent Application No. 2019-228823 dated Aug. 24, 2021.
Office Action issued in corresponding Japanese Patent Application No. 2020-104939 dated Aug. 24, 2021, with English translation.
Notice of Allowance issued in corresponding Japanese Patent Application No. 2018-233051 dated Sep. 21, 2021, with English translation.
Extended European Search Report issued in corresponding European Patent Application 21 164 360.6-1208 dated Oct. 4, 2021.
Office Action issued in corresponding U.S. Appl. No. 17/082,096 dated Oct. 5, 2021.

(56) References Cited

OTHER PUBLICATIONS

Decision to Grant issued in corresponding Korean Patent Application No. 10-2020-7027742 dated Sep. 23, 2021, with English translation.
Office Action issued in corresponding Korean Patent Application No. 10-2021-7031763 dated Oct. 8, 2021, with English translation.
Extended European Search Report issued in corresponding European Patent Application No. 21 172 028.9-1208 dated Nov. 22, 2021.

* cited by examiner

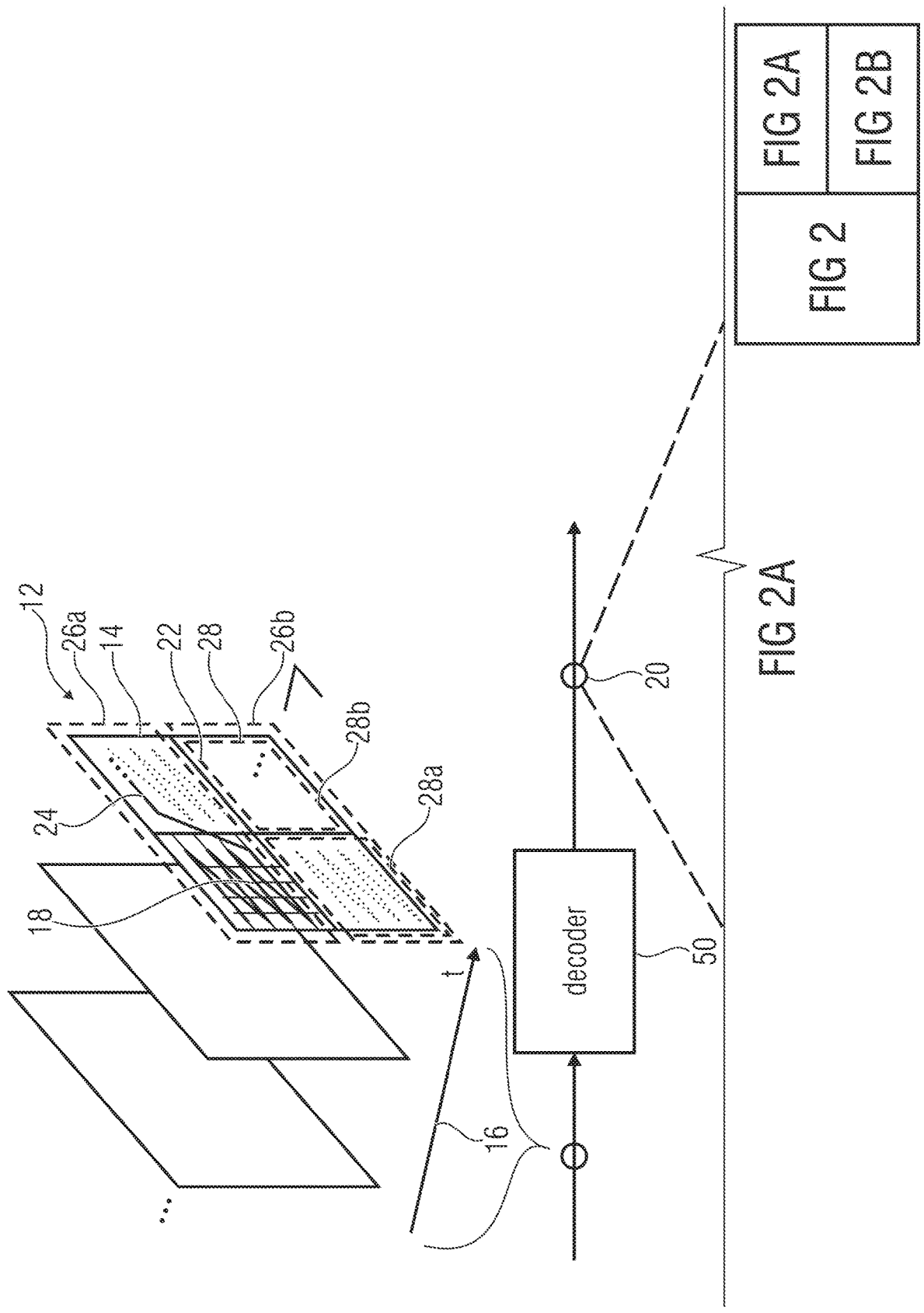

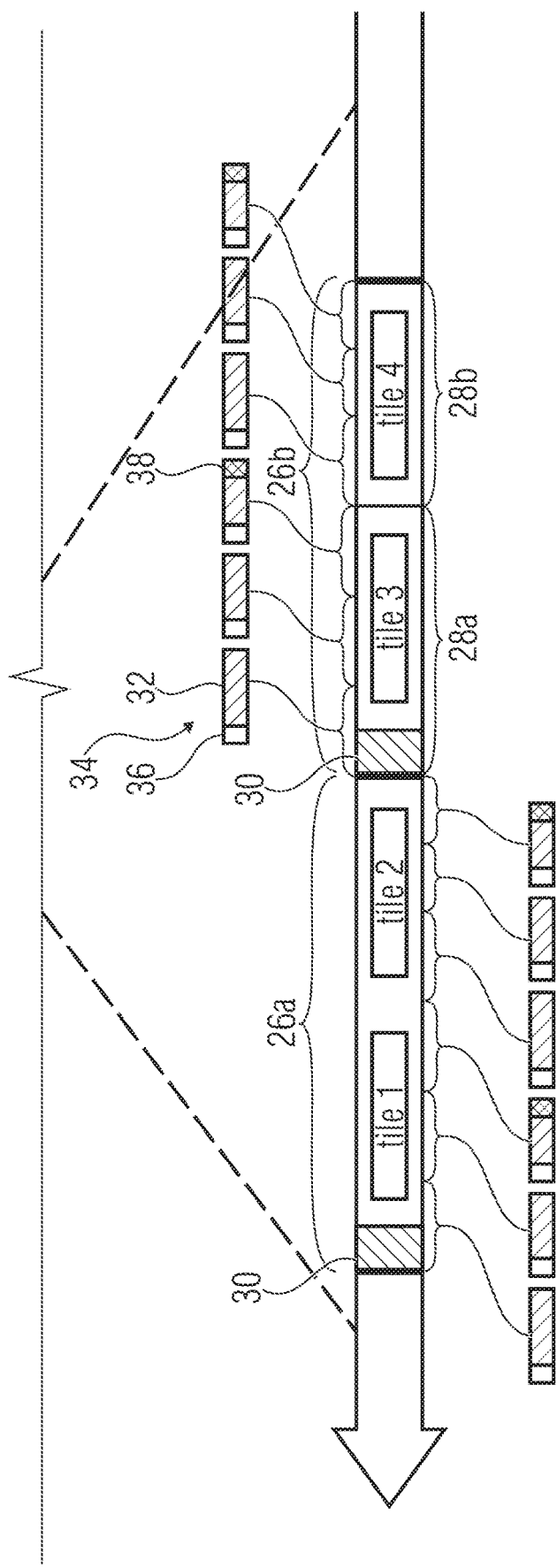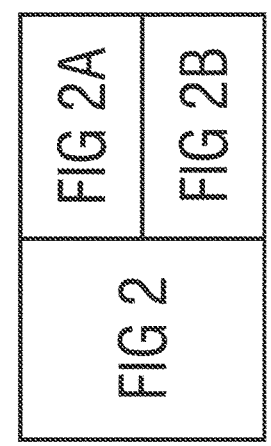
FIG 2B

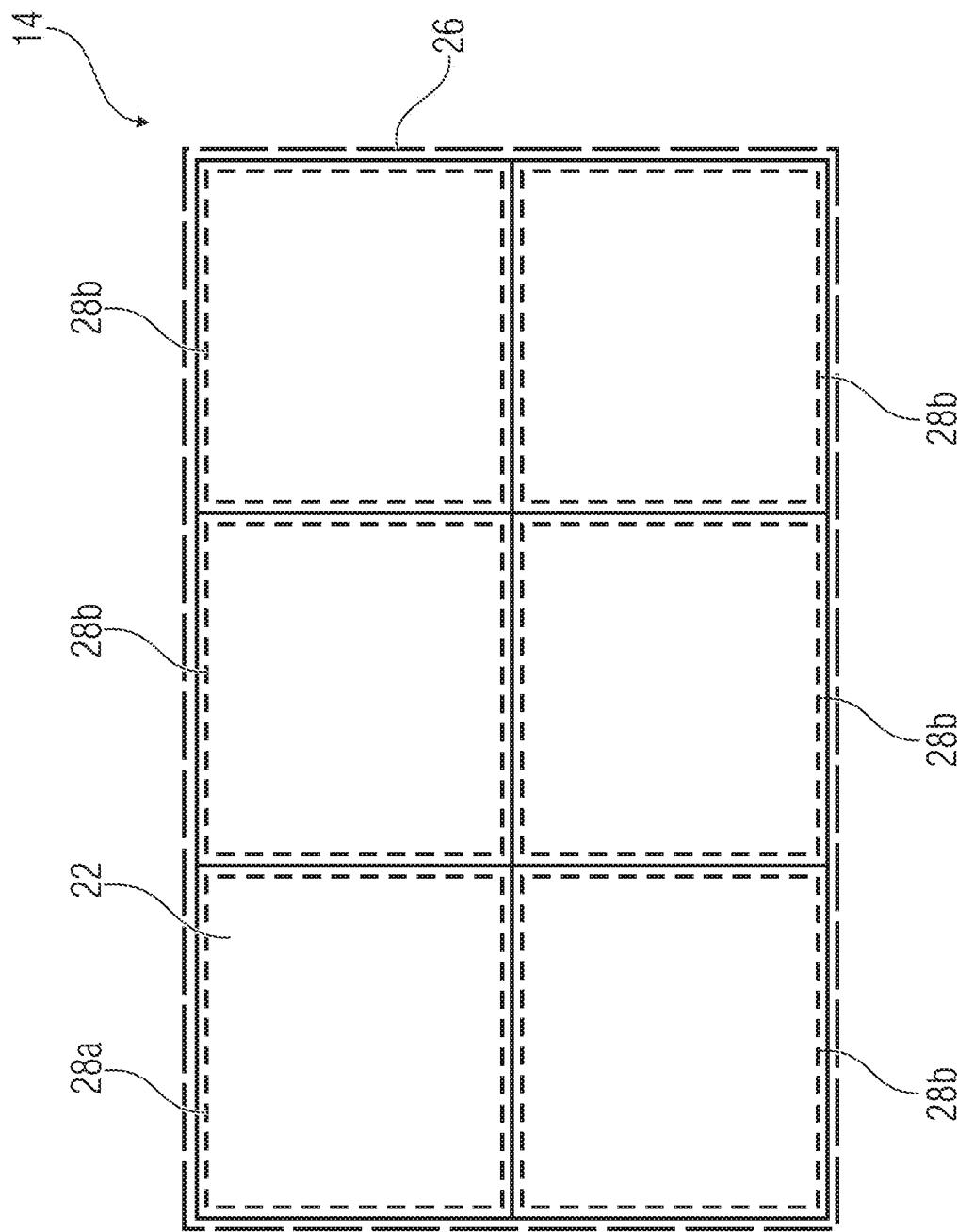

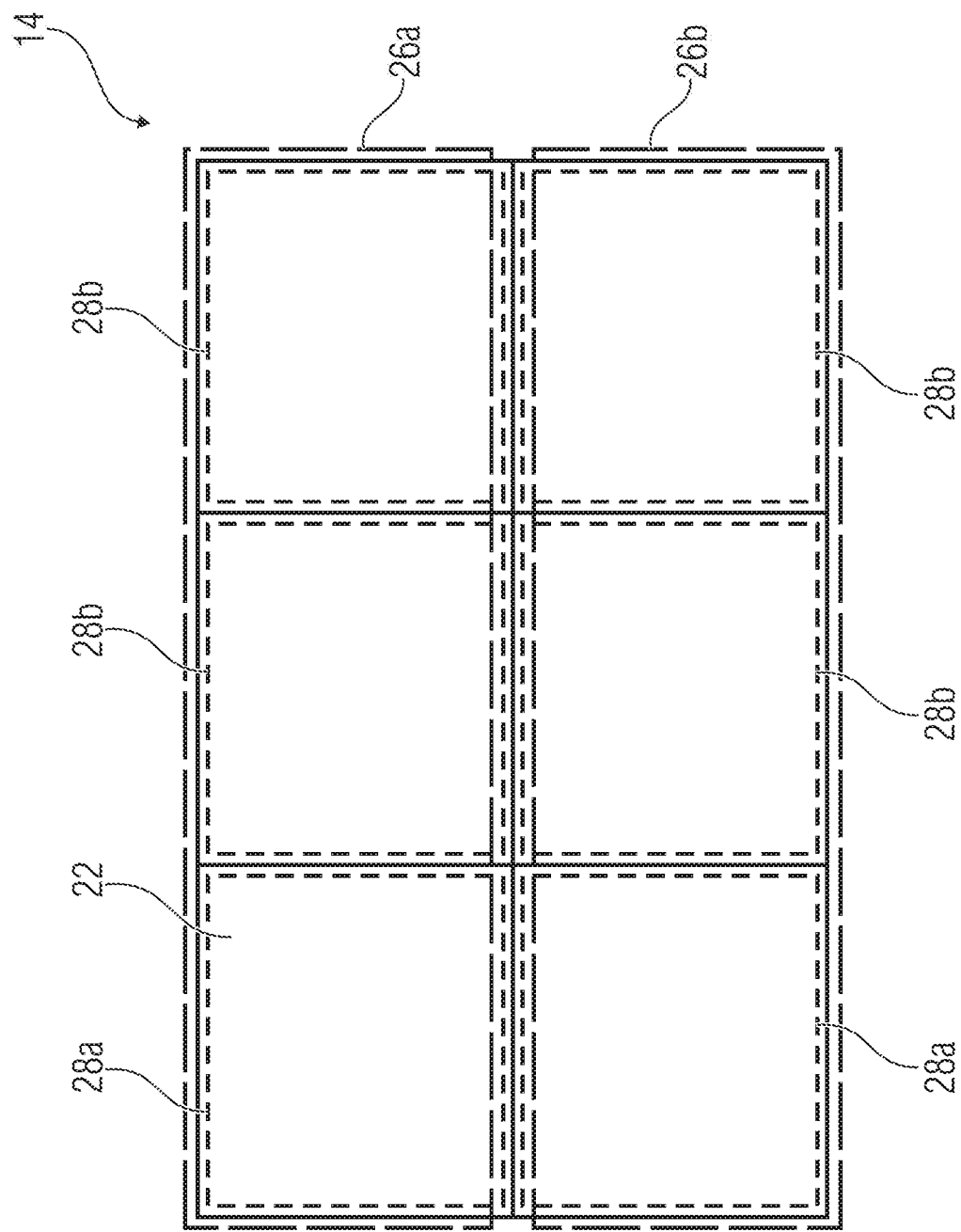

NETWORK DEVICE AND ERROR HANDLING

CROSS-REFERENCE TO RELATED APPLICATIONS

This application is a continuation of U.S. Ser. No. 14/995,260, filed Jan. 14, 2016, which is a continuation of International Application No. PCT/EP2014/065184, filed Jul. 15, 2014, which claims priority from U.S. Application No. 61/846,479, filed Jul. 15, 2013. The subject matter of each of the foregoing applications is incorporated herein by reference in entirety.

BACKGROUND OF THE INVENTION

The present application is concerned with a network device and its error handling relating to a transport stream of a sequence of packets via which a video data stream is transported.

Depending on the application, transport packet based video data stream transmission suffers from packet loss. Such packet loss may, for example, result from transmission errors exceeding an error correction capability of an optionally used forward error correction of the transport stream, the lack of any uplink connection so as to send acknowledgement of receipt signals, or a combination of both. Irrespective of the availability of an acknowledgement of receipt uplink, it is desirable to keep affected portions of the video data stream, not decodable due to the non-receipt of lost packets, as small as possible. Disadvantageously, however, packets of the transport stream may carry information necessitated for decoding the content carried by subsequent packets of the transport stream. In the HEVC standard, for example, the video data stream is composed of independent slice segments and dependent slice segments, the dependent slice segments depending on independent slice segments as far as, for example, the slice header data is concerned which is contained in the immediately preceding independent slice segment and inherited for the decoding of the dependent slice segment.

Accordingly, it would be favorable to have a concept at hand which enables a reduction of the amount of affected, non-decodable portions of a video data stream in the presence of packet loss.

SUMMARY

According to an embodiment, a network device may have: a receiver configured to receive a transport stream of a sequence of packets via which a video data stream is transported, the video data stream having tiles of pictures of a video into which the pictures are partitioned, encoded thereinto along a coding order using entropy coding and spatial prediction, the tiles being encoded into the video data stream with context derivation of the entropy coding and the spatial prediction being restricted so to not cross tile boundaries of the tiles, wherein the video data stream has the tiles of the pictures of the video encoded thereinto along the coding order in units of slices with each slice either containing data of one tile only or containing two or more tiles completely, each slice starting with a slice header, the video data stream being packetized into the sequence of packets along the coding order such that each packet carries data of merely one tile, wherein the device further includes an error handler configured to identify lost packets in a sequence of packets and analyze error resilience data in the packets of the sequence of packets so as to identify, for each of runs of one or more lost packets of the sequence of packets, a first packet in the sequence of packets after the respective run of one or more lost packets, which carries a begin of any of the tiles and participates in carrying a slice, the slice header of which is contained in any of the packets of the sequence of packets not being lost.

According to another embodiment, a method may have the steps of: receiving a transport stream of a sequence of packets via which a video data stream is transported, the video data stream having tiles of pictures of a video into which the pictures are partitioned, encoded thereinto along a coding order using entropy coding and spatial prediction, the tiles being encoded into the video data stream with context derivation of the entropy coding and the spatial prediction being restricted so to not cross tile boundaries of the tiles, wherein the video data stream has the tiles of the pictures of the video encoded thereinto along the coding order in units of slices with each slice either containing data of one tile only or containing two or more tiles completely, each slice starting with a slice header, the video data stream being packetized into the sequence of packets along the coding order such that each packet carries data of merely one tile, identifying lost packets in a sequence of packets; and analyzing error resilience data in the packets of the sequence of packets so as to identify, for each of runs of one or more lost packets of the sequence of packets, a first packet in the sequence of packets after the respective run of one or more lost packets, which carries a begin of any of the tiles and participates in carrying a slice, the slice header of which is contained in any of the packets of the sequence of packets not being lost.

Another embodiment may have a network device configured to transmit a video data stream via a transport stream of a sequence of packets, the video data stream having tiles of pictures of a video into which the pictures are partitioned, encoded thereinto along a coding order using entropy coding and spatial prediction, the tiles being encoded into the video data stream with context derivation of the entropy coding and the spatial prediction being restricted so to not cross tile boundaries of the tiles, wherein the video data stream has the tiles of the pictures of the video encoded thereinto along the coding order in units of slices with each slice either containing data of one tile only or containing two or more tiles completely, each slice starting with a slice header, wherein the network device is configured to packetize the video data stream into the sequence of packets along the coding order such that each packet carries data of merely one tile, and insert error resilience data into the packets of the sequence of packets so as to identify, for each packet of the sequence of packets not containing a slice header of the slice the respective packet carries partially, that packet preceding in the sequence of packets, which contains the slice header of the respective packet.

Another embodiment may have a method of transmitting a video data stream via a transport stream of a sequence of packets, the video data stream having tiles of pictures of a video into which the pictures are partitioned, encoded thereinto along a coding order using entropy coding and spatial prediction, the tiles being encoded into the video data stream with context derivation of the entropy coding and the spatial prediction being restricted so to not cross tile boundaries of the tiles, wherein the video data stream has the tiles of the pictures of the video encoded thereinto along the coding order in units of slices with each slice either containing data of one tile only or containing two or more tiles completely, each slice starting with a slice header, wherein the method includes packetizing the video data stream into the sequence of packets along the coding order such that each packet carries data of merely one tile, and inserting error resilience data into the packets of the sequence of packets so as to identify, for each packet of the sequence of packets not containing a slice header of the slice the respective packet carries partially, that packet preceding in the sequence of packets, which contains the slice header of the respective packet.

Another embodiment may have a non-transitory digital storage medium having a program code for performing, when running on a computer, an inventive method.

It is a finding of the present application that the number of negatively affected (despite being correctly received) packets due to packet loss may be reduced by providing, and analyzing, error resilience in the packets of the sequence of packets and identifying, for each of runs of one or more lost packets of the sequence of packets, a first packet in the sequence of packets after the respective run of one or more lost packets, which carries a beginning of any of the tiles of the video data stream, and concurrently carries a slice, the slice header of which is contained in any of the packets of the sequence of packets not being lost. In particular, the side information overhead for transmitting the error resilience data is comparatively low compared to the reduction in negatively affected packets due to packet loss.

BRIEF DESCRIPTION OF THE DRAWINGS

Embodiments of the present invention will be detailed subsequently referring to the appended drawings, in which:

FIGS. 2A, 2B (collectively referred to as "FIG. 2"), show a schematic diagram of the decoder, a video reconstructed thereby on the basis of the video data stream and the video data stream and its transport via a sequence of packets, wherein embodiments of the present application may be applied to the decoder of FIG. 2;

FIG. 3 schematically shows a picture 14 partitioned into tiles and slice segments in accordance with a first option;

FIG. 4 exemplarily shows a schematic of picture 14 using another segmentation option;

FIG. 5 shows an illustration of two packet streams on a lossy channel so to illustrate the problems which embodiments of the present application deal with;

DETAILED DESCRIPTION OF THE INVENTION

The following description of embodiments of the present application starts with a description of an exemplary video codec or exemplary encoder/decoder structure. Thereinafter, the problems resulting from packet loss are discussed. Thereinafter, embodiments of the present application are described, these embodiments being, inter alias, applicable with respect to the previously described encoder/decoder structure.

Figure 1:
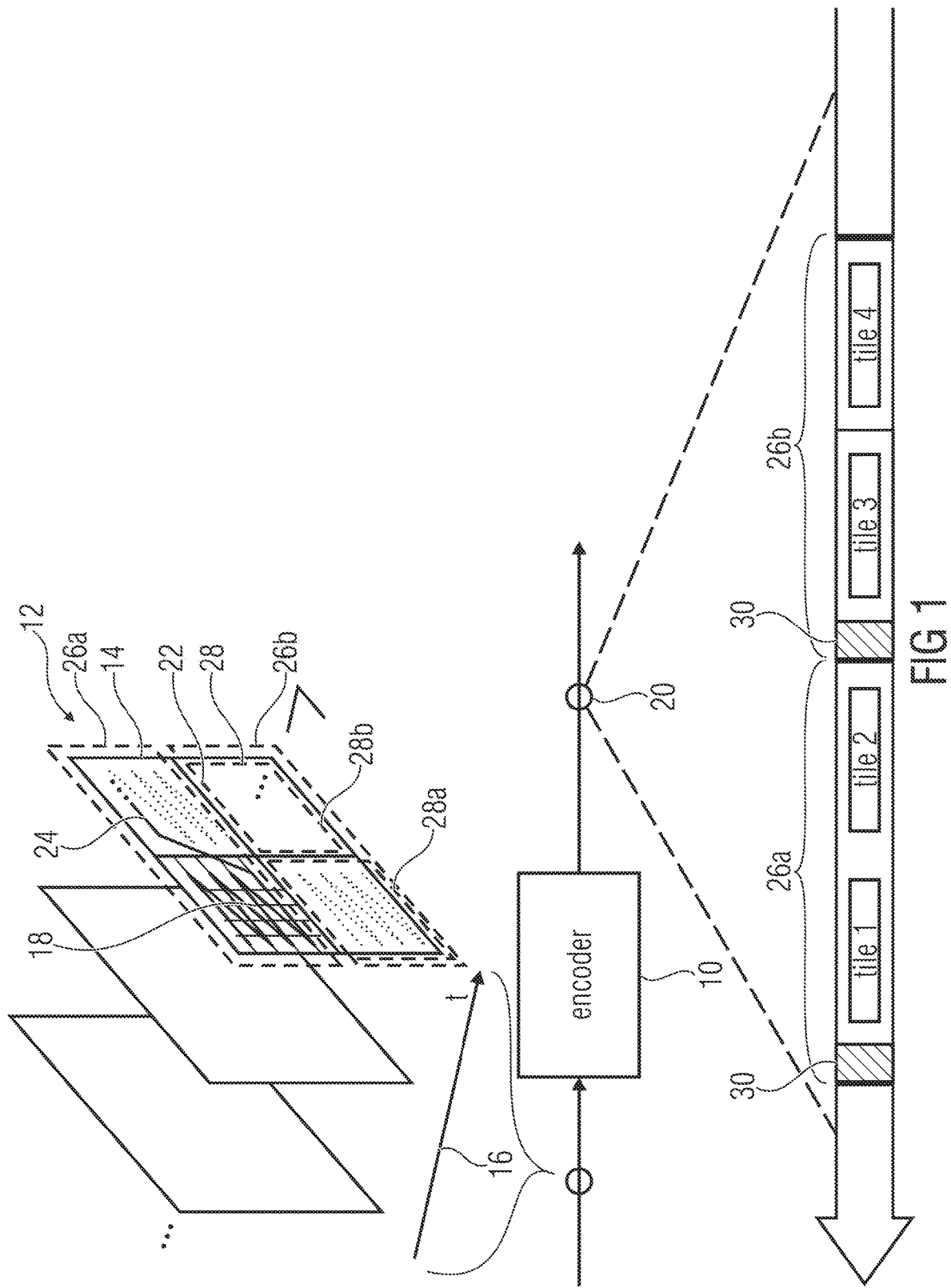
FIG. 1 shows a schematic diagram of an encoder, a video encoded thereby and a video data stream generated thereby, wherein embodiments of the present application may be supported by the encoder of FIG. 1.

FIG. 1 shows an encoder 10 configured to encode a video 12 composed of a sequence of pictures 14, which arrives at the encoder's 10 input, into a data steam at the encoder's 10 output. The encoder 10 may be configured to encode the sequence of pictures 14 using a coding order which may, but does not necessarily have to, follow the temporal order 16 of pictures 14. More precisely, encoder 10 may be a hybrid video encoder configured to select among different available prediction modes for blocks 18 into which picture 14 is partitioned. Such prediction modes may, for example, include spatial prediction from previously coded portions of the same picture and temporal prediction from previously coded portions of previously coded pictures, but additionally or alternatively, other prediction modes may be supported by encoder 10 as well, such as inter-layer prediction modes from previously coded layers of lower quality, for example, or inter-view prediction from previously coded views showing the same scene as temporally aligned picture 14 of video 12. The encoder 10 signals the selected prediction modes, prediction parameters associated with the selected prediction modes along with a coding of the prediction residual within the data stream 20 at its output. For example, spatial prediction may involve an extrapolation direction indicating the direction along which neighboring already encoded samples are copied/extrapolated into the current block 18, and the temporal prediction mode may be embodied as motion compensated prediction involving motion vectors as prediction parameters, just as the inter-view prediction mode may be embodied in a motion compensated manner, thereby resulting in disparity vectors as prediction parameters. In performing the prediction, "previously coded portions" of video 12 are defined by the aforementioned coding order, which traverses picture 14 sequentially. Within each picture 14, the coding order traverses blocks 18 in a predetermined order too, which leads, for example, in a raster scan manner from the top left corner of picture 14 towards the bottom right hand corner thereof.

For the sake of enabling parallel encoding and parallel decoding of the pictures 14 of video 12 and/or a selective/partial decoding of pictures 14 of video 12, the encoder 10 of FIG. 1 supports so called tile partitioning. According to tile partitioning, each picture 14 is, for example, partitioned into an array of tiles 22. In FIG. 1, one picture 14 is exemplarily shown to be partitioned into a 2×2 array of tiles 22, but any m×n partitioning may be used (if tile partitioning is affective, then m+n>1). The partitioning into tiles 22 may be restricted so as to not cross blocks 18, i.e. be restricted so as to be aligned to block boundaries. The tiles may, for example, be p×q arrays of blocks 18, so that tiles in a row of tiles have equal q and tiles in a tile column have equal p.

The encoder 10 signals the tile partitioning of pictures 14 within data stream 20, and in particular encodes each tile individually 22. That is, interdependencies resulting, for example, from spatial prediction, context selection in entropy coding data stream 20, for example, are restricted at tile boundaries so as to not cross the latter so that each tile 22 is individually decodable from data stream 20 as far as the prediction and entropy decoding is concerned, for example. The aforementioned coding order is adapted to the tile partitioning: within each picture 14, the coding order traverses picture 14 within a first one of tiles 22 first, then traversing the next tile in a tile order. The tile order may also be a raster scan order leading from the top left tile to the bottom right hand tile of picture 14.

For illustration purposes, FIG. 1 shows the coding order for one exemplary picture 14 with reference sign 24.

In order to ease the transmission of the data stream 20, encoder 10 encodes video 12 into data stream 20 in the aforementioned manner in units of so-called slices: slices are portions of the data stream 20 following the aforementioned coding order. Slices are restricted to either completely lying within one tile 22, i.e. to not cross any tile boundary, or to be composed of two or more tiles in tile order completely, i.e. so as to cover two or more tiles in their entirety, thereby coinciding, in slice boundary, with the outline of the tiles it covers.

FIG. 1 exemplarily shows picture 14 of FIG. 1 as being partitioned into two slices 26a, 26b, the first slice 26a in coding order 24 being composed of the first two tiles 22 in tile order, and the second slice 26b covering the lower half of picture 14, i.e. the third and fourth tiles 22 in tile order. In encoding video 12 in units of the slices 26a and 26b, encoder 10 uses entropy coding and in particular context-adaptive entropy coding with continuous adaptation of the contexts' entropy probabilities so as to adapt the probabilities used for entropy encoding to the actual symbol statistics and picture content, respectively, wherein the contexts' probabilities are reset or initialized at the beginning of each slice 26a and 26b, and, within each slice, at each tile boundary.

FIG. 1 exemplarily shows the slice 26 in data stream 20. The slice contains the data of the first two tiles 22 of picture 14. Further, the slice 26 comprises a slice header 30 which indicates some high level information concerning the coding type chosen for coding the corresponding portion of picture 14 and the slice 26, i.e. the first two tiles 22, such as, for example, the information whether tile 26 concerns an intra-coded portion, a p-type coded portion or a b-type coded portion. Without the information in slice header 30, the tiles of slice 26a are not decodable correctly.

Another mechanism in order to be able to further subdivide the transmission of the coded data stream 20 is to further subdivide slices. According to this principle, each slice 26a and 26b is either composed of exactly one independent slice segment as it is the case with slice 26a, or a sequence of one independent slice segment followed by a dependent slice segment. Slice 26a is not divided any further. The encoder 10 is, thus, able to output slice 26a merely in its entirety. With respect to slice 26b, things are different: slice 26b is composed of an independent slice segment 28a followed, in coding order, dependent slice segment 28b, with the tile boundaries of the tiles 22 within slice 26b coinciding with the boundary between slice segments 28a and 28b. Slice segments 28a and 28b, thus, have similar properties as slices do, i.e. they are independently decodable, except for the slice header: dependent slice segments 28b inherit the slice header 30 from the preceding, i.e. leading, independent slice segment 28a of the slice 26b to which same belong.

Before discussing the problems resulting from possible packet losses during transmission, a decoder 50 fitting to the encoder 10 of FIG. 1 is discussed with respect to FIG. 2, the decoder 50 thus representing an example for a network device for processing data stream. The decoder 50 receives the data stream 20 and reconstructs therefrom video 14. The decoder 50 receives, for example, slice 26a followed by slice 26b. For example, the decoder 50 may be of the hybrid video decoding type, i.e. may be a hybrid video decoder, which uses the above identified prediction nodes for reconstructing the portions of pictures 14 of video 12, corresponding to slices 26a and 26b. In decoding slice 26a, for example, decoder 50 uses the slice header 30 in order to determine the slice type of slice 26a and reconstruct the first and second tiles 22 of picture 14 from slice 26a in a manner dependent on the slice type. For example, for I slices, no temporal prediction mode is available, whereas for P and B slices availability is provided, and accordingly, the parsing of the payload data of slice 26a may depend on the slice header 30. In particular, decoder 50 may, for example, entropy decode slice 26a in the above outlined context-adaptive manner with initializing the contexts' probabilities at the beginning of slice 26a with then using the prediction mode and prediction parameters signaled within slice 26a in order to predict the first and second tiles 22 within slice 26a, and combine the resulting prediction signal with a prediction residual also comprised within the payload data of slice 26a. In decoding the tiles 22, decoder 50 obeys the coding order outlined above. However, decoder 50 is free to perform some of the decoding tasks in parallel as far as tiles 22 are concerned. This is, for example, true for the prediction as the prediction is configured so as to not cross tile boundaries so that interdependencies between the decoding of tiles of the same picture 14 is avoided, and the entropy decoding may also be performed in parallel as far as tiles 22 are concerned.

In decoding slice 26b, decoder 50 is able to decode this slice 26b independent from slice 26a. In particular, as independent slice segment 28a carrying the data of the third tile 22 of picture 14, comprises a slice header by itself, decoder 50 is able to reconstruct this third tile without needing any other data. As far as dependent slice segment 28b is concerned, decoder 50, however, inherits the slice header data from the slice header 30 contained in the independent slice segment immediately preceding the same, i.e. independent slice segment 28a of the same slice 26b, and accordingly, the decoding of the fourth tile necessitates the knowledge of the slice header in slice segment 28a in addition to the presence of the slice segment 28b.

As far as the transmission of data stream 20 is concerned, the slice segments 26a, 28a and 28b form, or are framed so as to result in, network abstraction layer (NAL) units. In the following description, slice segments and slice segment NAL units are not especially distinguished. The reason is that slice segments are almost the same as NAL units carrying slice segments. A small NAL unit header merely comprises a NAL unit type indicating the content of the NAL unit as being a slice segment.

Further, however, it should be noted that during transmission, slice segments may be further fragmented so as to fit into the payload section of transform packets. Advantageously, this is done in a manner so that the onset or beginning of a new tile within a certain slice 26a is inserted into a new transport packet. With respect to dependent slice segments 28b, the beginning of which represents the start of the coding of a new tile, this means same are decodable even if the preceding packet is lost, provided, as discussed further below, the slice header data is available. FIG. 2 illustrates the fragmentation of slice segments 26a, 28a and 28b into the payload data sections 32 of transport packets 34 which comprise, in addition to the payload sections 32, transport packet headers 36, wherein FIG. 2 also shows that the trailing portions of payload sections of transport packets containing the end of a slice segment may be filled with padding bits 38 distinguished from the size segment data by depicting slice segment data within the packets 34 payload data sections 32 simply hatched, and depicting heading bit 38 cross-hatched.

Problems occur whenever packets are lost during transmission. In particular, imagine that slice segment 28a is not received at decoder 50 completely due to, for example, the second and third packets into which slice segment 28a has been fragmented being lost. The first transport packet 34, however, carries the slice header 30. Accordingly, the decoder is able to resume decoding picture 14 with dependent slice segment 28b provided that decoder 50 is sure that the slice header 30 of independent slice segment 28a, which has been received before the packets having been lost, is the slice header belonging to dependent slice segment 28b. However, this is not guaranteed for the decoder 50 in any case.

For example, look at FIG. 3 which shows a picture 14 now exemplarily subdivided/partitioned into six tiles, namely two rows and three columns of tiles 22, wherein there is one slice segment per tile. In particular, in the case of FIG. 3, the first tile is incorporated into an independent slice segment 28a, while the following five slice segments are dependent slice segments 28b. FIG. 4 shows the same tile partitioning, but the first three tiles in the first row of tiles 22, form one slice 26a composed of a first independent slice segment 28a covering the first tile, following by two dependent slice segments 28b covering the second and third tiles 22 of FIG. 14, and likewise the second slice 26b is composed of a sequence of an independent slice segment 28a covering the fourth tile of picture 14, followed by two dependent slice segments 28b relating to the fifth and sixth tile of picture 14. In the case of receiving all data relating to picture 14, the decoding of picture 14 is of no problem irrespective of having chosen the option of FIG. 3 of the option of FIG. 4 at the encoding side. However, problems occur when, for example, the fourth slice segment gets lost: in the case of FIG. 3 there is actually no problem for the succeeding slice segments relating to the fifth and sixth tiles of picture 14 as same inherit the slice header data from the first slice segment. In the case of FIG. 4, however, the slice segments relating to the fifth and sixth tile are of no value anymore, as they would need the slice header data of the lost fourth packet, which in the case of FIG. 4 is an independent slice segment.

In order to enable the decoder 50 to resume decoding picture 14 with respect to the fifth and sixth tiles 22 in case of FIG. 3, the concept outlined below suggests providing the data stream with error resilience data enabling the identification of the packet carrying the slice header of the independent slice segment for dependent slice segments.

It is noted again that encoder and decoder 50 are configured to, in entropy decoding slices contained in the single segment slice such as slice 26a of FIG. 2, reset the continuous contexts' probabilities, i.e. the contexts' probabilities, to default values, whenever during encoding, the first syntax element of a second or following tile of the respective slice segment is encountered. For this reason, the case of having a single slice segment, such as 26a of FIG. 2, for example, results in the second tile of the slice segment 26a still being decodable despite the loss of any of the second and third transport packets 34 carrying slice 26a, provided that the first transport packet 34 carrying the slice header 30 has been correctly received: the decoder 50 may perform the entropy decoding using the default of initialization values for the contexts' probabilities to entropy decode the data of slice 26a concerning the second tile 22, and use the slice header data 30 comprised by the first transport packet 34 of the six packets into which slice 26a has been fragmented tile-wise, i.e. with opening a new packet 34 with a first syntax element concerning the second tile and filling the preceding packet comprising the tail of the data of slice of 26a concerning the first tile with padding data. Thus, the case discussed in FIG. 3 is very similar to a case where a single independent slice segment covers the whole picture 14: in entropy en/decoding this independent slice segment, the contexts' probabilities would be initialized anew each time a tile border between consecutive tiles in tile order is encountered and accordingly, the decoder would be able to resume the decoding of the fifth tile, for example, despite the loss of packets concerning the fourth tile provided that the header of the slice header at the beginning of the independent slice segment has been correctly received.

The problem outlined with respect to FIGS. 3 and 4 is outlined again in the following in other words. In a video transmission scenario, it is often expected that losses will occur. Such losses may result in data that, although correctly received, is not decodable due to dependencies to the lost data. E.g., in RTP, and as illustrated in FIG. 2, slices 26a,b may be transported over several RTP packets 34 (usually called fragmentation units). If one of those packets 34 of a slice is lost, many decoders—such as decoder 50—would have to discard all data of the corresponding slice or may try to decode the data until the lost part and discard the rest of the received data of that slice. However, slices 26a,b may contain independent parts that can be independently decoded. This is the case for multiple tiles contained in a single slice for HEVC [1]. When multiple tiles 22 are contained in a single slice, such as more than 2 as depicted in FIGS. 3 and 4, either in a single independent slice segment (cp. 26a in FIG. 2) or in one slice segment per tile (cp. 26b in FIG. 26b) (with the first tile of the slice contained in an independent slice segment, and the rest of the tiles within the slices contained in dependent slice segments), transport of the data taking into account the tile boundaries may be desirable. That is, RTP packets 34 may be aligned with tile boundaries or in other words, each RTP packet contains only data of one tile and not of several tiles (which is the case when separate dependent slices are used for each tile since slice segments 26a, 28a, and 28b are fragmented separately anyway) and may be the case if smart fragmentation of the data is done, e.g. RTP packets are aligned with tile boundaries, in case of a single independent slice segment carrying several tiles). By doing so, if data of some tiles is lost or some kind of selective decoding of partial data is carried out, it is still possible to decode other tiles since they do not depend on the non-received tiles for decoding.

In the described cases, both in the single independent slice segment for multiple tiles (cp. 26a) or in the case where dependent slice are used (cp. 26b in FIG. 2 and FIG. 3 and FIG. 4), all tiles 22 of an slice necessitate the correct reception of the slice segment header 30 of the independent slice 28a. However, in an scenario where not all data has been received and some packets 34 are missing, it is—without the concept further outlined below—not possible to know whether the slice segment header of the last received independent slice segment is the slice segment header corresponding to a given slice segment following losses (and containing e.g. an independent tile) or the necessitated slice segment header of an independent slice has not been received due to the losses. An example is shown in the FIG. 5.

Figure 5:
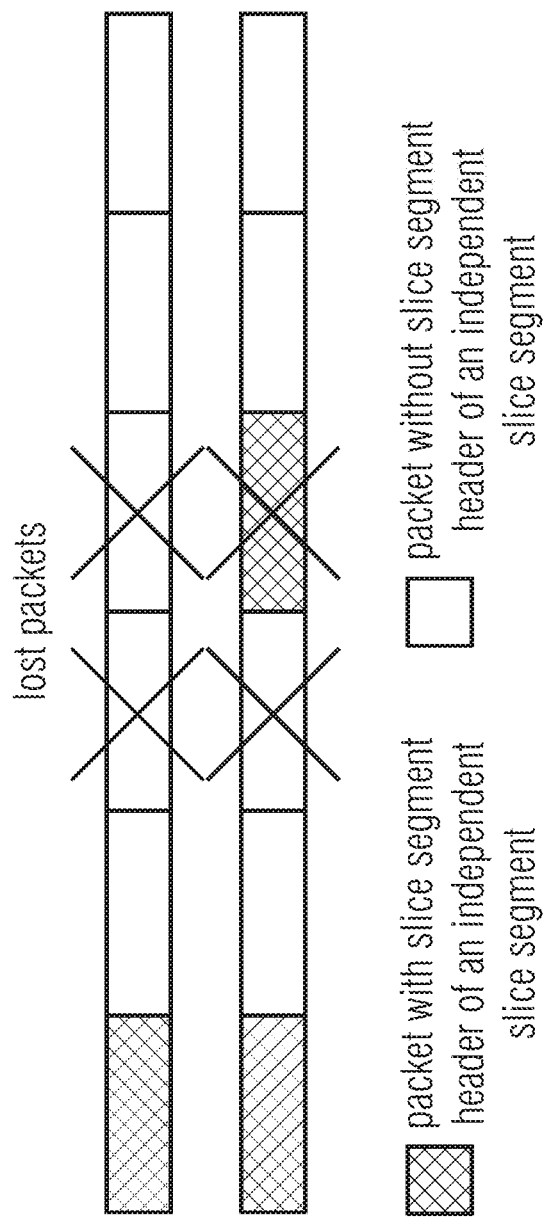

In the example at the top of the FIG. 5 which exemplarily corresponds to the packaging of each slice segment of FIG. 3 into a separate packet, the 5-th packet could be decoded if it contains an independent part of the data as described before (e.g. tile) since the necessitated slice segment header information has been received, while in the example at the bottom of FIG. 5 which exemplarily corresponds to the packaging of each slice segment of FIG. 4 into a separate packet, the 5-th packet cannot be decoded since the header information contained in the previous packet has been lost.

The below-outlined concept takes advantage of the fact that there are some data that is independent from other and can be used providing some kind of error resiliency in lossy environments. The problems is that it is—without the below-outlined concept—impossible to detect whether this important information contained in the previous slice segment header of the independent slice has been received or has been lost.

Therefore, according to the below-outlined concept, some signaling is added that allows the receiver to detect whether the previously received slice header data from the independent slice segment applies also to the currently received data or the necessitated data applies to some lost data.

An instantiation of such a signaling could be some supplementary information as e.g. in a NAL unit specific to an RTP payload, as e.g. the PACSI in the RTP payload format of SVC (RFC6190) but defined for HEVC or its extensions that contains an identifier to the slice segment header necessitated for decoding the data in an RTP packet.

This signaling could, for example, entail a flag (e.g. T flag) that indicates the presence/absence of such error resilience information in the form of an identifier. The supplemental information would be used to assign this identifier to a certain slice segment header or to indicate which slice segment header of an independent slice segment with a given identifier is needed for a certain data to be decodable. That is, if this information directly precedes data with a slice segment header of an independent slice segment, the identifier is assigned to the slice segment header of this independent slice segment and if not, it indicates which is the identifier of the slice segment header necessitated to the correct decoding of the following data.

In an embodiment, the original data contains independent decodable data which necessitates certain header information that is only transmitted once for all data. If this header information is correctly received, even though some data may be lost the other received independent decodable data can be decoded if the additional supplementary information that allows identifying the necessitated important header information matches to the header information previously received.

The just outlined concept of providing and analyzing error resilience data in the packets via which the video data stream is transmitted, is described in more detail below with respect to the following figures.

Figure 6:
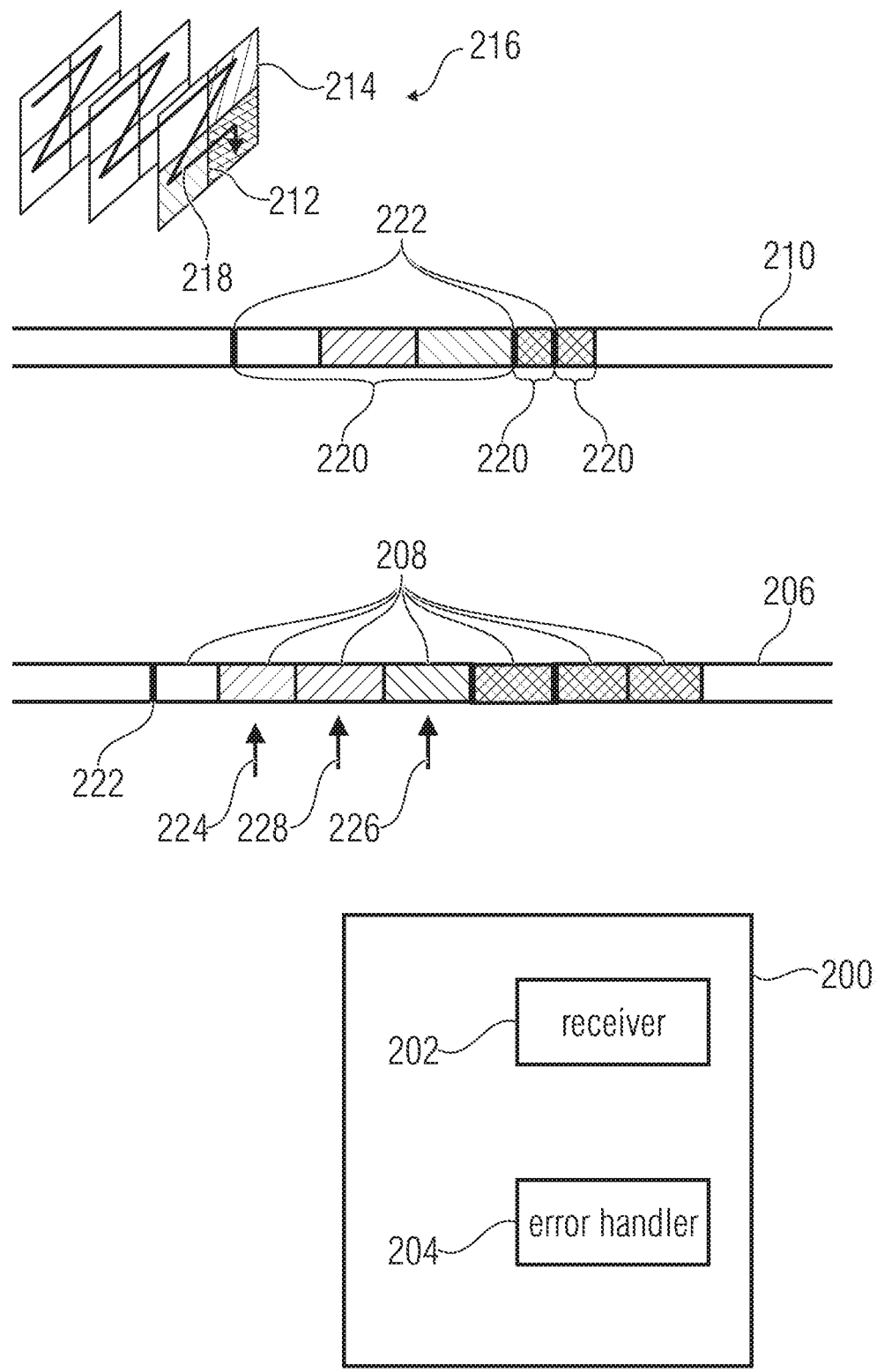
FIG. 6 shows a schematic block diagram of a network device according to an embodiment, wherein the network device may be part of, or may be connected in front of, the decoder of FIG. 2.

In particular, FIG. 6 shows a network device 200 which could be arranged in front of, or form a part of, decoder 50. The network device comprises a receiver 202 and an error handler 204.

The transport stream which the receiver 202 receives is shown at 206. It comprises a sequence of packets 208—corresponding elements 34 of FIGS. 1 and 2—via which the video data stream 210 is transported. The packets may, for example, be RTP packets as described above, but alternative implementations also exist, such as the use of IP packets or the like. The video data stream 210—corresponding to element 20 of FIGS. 1 and 2—has tiles 212—corresponding to element 22 of FIGS. 1 to 4—of pictures 214—corresponding to element 14 of FIGS. 1 to 4—of a video 216—corresponding to element 12 of FIGS. 1 and 2—encoded thereinto along some coding order 218—corresponding to element 24 of FIGS. 1 and 2—leading, for example, in a raster scan order through the tiles of a picture so as to then step to the next picture 214 in a picture coding order which may, however, not necessarily coincide with the presentation time order among pictures 214. In particular, the tiles 212 are encoded into the data stream 210 using entropy coding and spatial prediction. In doing so, the tiles 212 are encoded into the data stream 210 with context derivation of the entropy coding and the spatial prediction being restricted so as to not cross tile boundaries of the tiles 212 which are, in the figure, illustrated using dashed lines. The association between the consecutive portions covered by the tiles 212 of an exemplary picture 214 in the data stream 210 is illustrated in the figure using the same dashing type in the picture 212 on the one hand and the illustrated data stream 210 on the other hand. Using the restriction, tiles 212 are, as far as entropy coding and spatial prediction are concerned, encodable and decodable in parallel.

The video data stream has the tiles 212 encoded thereinto along the coding order 218 in units of slices 220. Each slice 220 either contains data of one tile 212 only as is exemplarily the case for the two slices at the right hand side illustrated in the FIG. 6, or more tiles completely as illustrated in the FIG. 6 with respect to the left-hand one which includes the data of the three leading tiles of a picture along coding order 218. Each slice starts with a slice header 222—corresponding to element 30 of FIGS. 1 and 2—which collects certain higher-level syntax elements globally valid for the whole slice such as, for example, quantization step size, default coding modes, slice type—as exemplarily discussed above—or the like. This, in turn, means that in case of a slice 220 covering more than one tile, every tile contained in that slice besides the first one, needs for its successful decoding, data of the slice header of the slice which is, however, arranged at the beginning of the slice.

Although not mentioned before, it may be that slices are further sub-divided into so-called independent slice segments and dependent slice segments along the coding order: an independent slice segment at the beginning which comprises the slice header explicitly, followed by one or more dependent slice segments which inherit at least a portion of the slice header of the independent slice segment and thus, need this portion to be available to successfully decode the dependent slice segment. Each begin of a tile may coincide with the beginning of a slice segment, either dependent or independent.

The video data stream 210 is packetized into the sequence of packets 208 along the coding order 218 such that each packet carries data of merely one tile. This is, again, illustrated in the FIG. 6 using the four different dashing types associated with the four different tiles of the exemplary picture.

While the receiver 210 receives the transport stream 206, the error handler 204 is configured to identify lost packets among packets 208, i.e. ones which are either not received, not received in time, or received in a manner so that the same have errors in it or are not forward error correctable due to a too high a number of bit errors which occurred, for example, during transmission. Further, the error handler 204 analyzes error resilience data in the packet 208 of the sequence of packets so as to identify, for each of runs of one or more lost packets of the sequence of packets, a first packet in the sequence of packets of the respective run of one or more lost packets, which carries a begin of any of the tiles and is contained in a slice, the slice header of which is contained in any of the packets of the sequence of packets not being lost. Imagine, for example, that the packet 208 identified using arrow 224 would have been lost. Normally, the following two packets forming fragments of the same slice, namely 226 and 228, would have been thrown away by a transport layer. Here, the error handler 204 identifies that packet 226 is a packet which fulfills all of the just mentioned requirements: 1) it is after a respective run of one or more lost packets, namely packet 224, and 2) the slice header 222 of the slice 220 to which the data contained in packet 226 belongs, has not been lost, 3) the packet 226 carries the begin of a tile 212, and 4) this packet 226 is the first one of the packets which fulfills 1) to 3). Packet 228 being between lost packet 224 and just-mentioned packet 226 does not fulfill requirement 2. Accordingly, error handler 204 may subject packet 226 to decoding rather than discarding the content, i.e. the tile 212, thereof. Naturally, from the packet on, the handler 204 keeps on processing the packets in sequential order up to encountering the next run of one or more lost packets.

The just mentioned error resilience data may be contained in a packet header of the transport packets 208 or may be contained in, for example, supplemental enhancement NAL units of data stream 210 interspersed between the payload slices 220.

Figure 7:
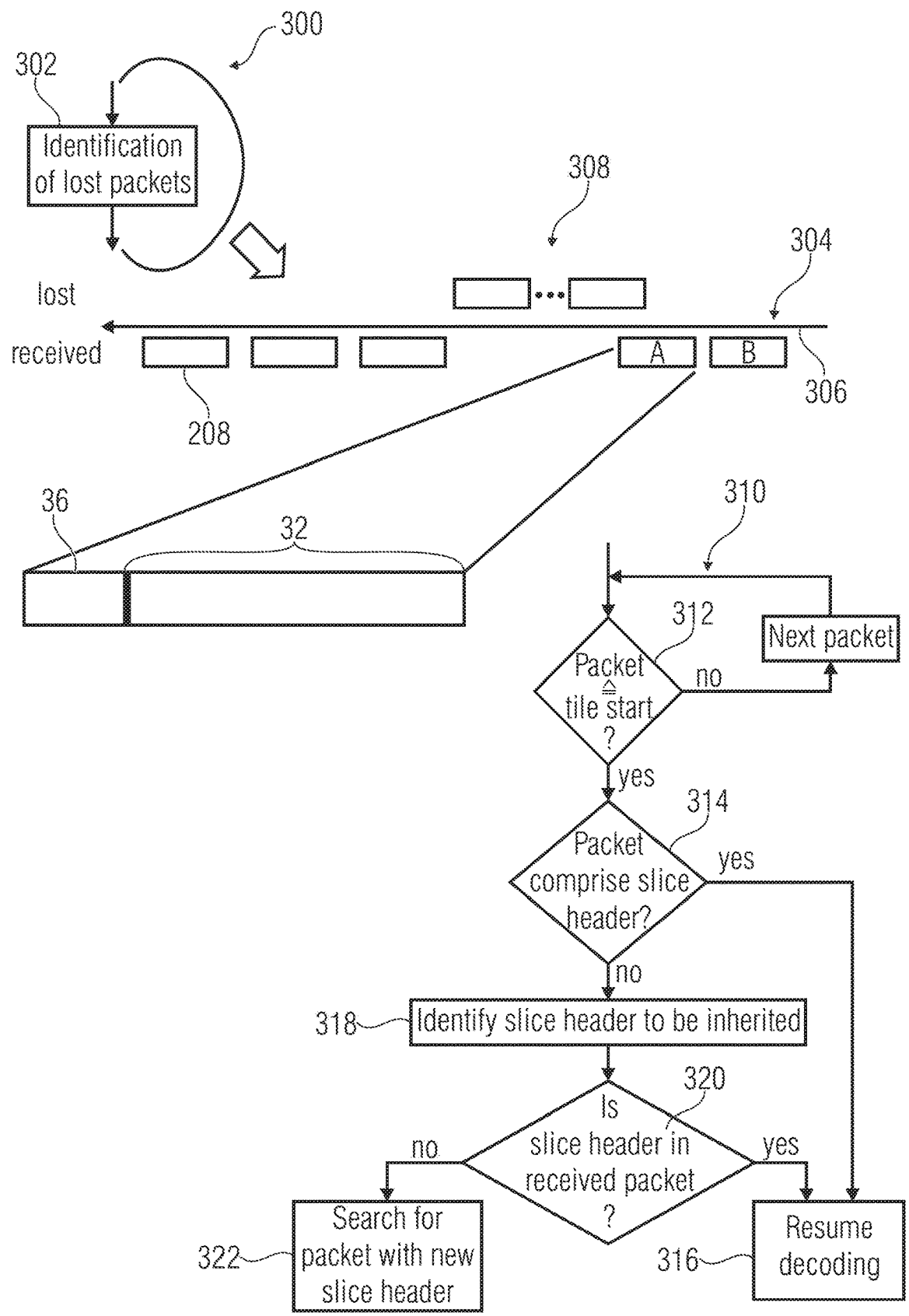
FIG. 7 shows schematically and using a flow diagram structure, a possible mode of operation of the error handler of FIG. 6 in more detail.

The mode of operation of the error handler 204 is described in the following with respect to FIG. 7 in more detail. In particular, the error handler continuously surveys, in one process 300, the inbound sequence of packets in order to identify lost packets. The identification 302 may, for example, involve for each packet 208 an inspection of the packet header 36 (compare FIGS. 1 and 2) such as a round robin packet number or the like. Process 300 results in the detection of runs of one or more lost packets within the sequence of packets as illustrated at 304, which shows the sequence of packets 208 in their sequential order with lost packets being arranged above the sequence error 306 and the correctly received packets being shown beneath error 306. As can be seen, one exemplary run of is visible at 308. Another process 310 continuously performed by error handler 204 relates to the analysis error resilience data in the packets of the sequence of packets. Within this process 310, for each run 308, the error handler 204 seeks to identify the first packet in the sequence of packets after the respective run 308, which carries a beginning of any of the tiles and carries a slice, the slice header of which is contained in any of the packets of the sequence of packets not being lost. The process 310 cycles through the received packets following run 308. The first received packet after run 308 is denoted in FIG. 7 using A. Within process 310, error handler 204 checks whether the respective packet A carries a beginning of any of the tiles. Within this check 312, error handler 204 subjects, for example, the payload data section 32 of packet A to a parsing process to identify whether this payload section 32 starts with the beginning of the coding of any tile or is at least parsable until the reach of such coding. For example, the start of the payload data section 32 coincides with the start of a slice segment NAL unit and the error handler 204 reads an edges field from the slice segment in order to assess whether the slice segment starts the coding of a new tile. Alternatively, the error handler 204 checks whether packet A is the first fragment of a NAL unit based on, for example, fragmentation parameters within a transport packet header 36 and, if this is the case, deduces therefrom that packet A has in its payload data 32 the beginning of a new tile.

If the packet is determined in step 312 not to coincide with the start of a new tile, process 310 proceeds with the next received packet, here B. However, if the check result of check 312 is positive, i.e. a tile start has been found, process 310 involves error handler 204 checking whether the current packet A comprises itself a slice header. If yes, all is fine and from packet A on the decoding procedure may be resumed after the run of lost packets 308 as indicated at step 316. However, if the check in step 314 reveals that the current packet does not comprise, by itself, a slice header, then the error handler 204 inspects error resilience data within the current packet A so as to identify the slice header of the slice carried by the respective packet, i.e. the slice header to be inherited by the dependent slice segment concerning the new tile, or the slice header of the slice, i.e. independent slice segment, to which the new tile identified in step 312 belongs. The identification 318 may work as follows: for example, the transport packet header 36 of packet A itself may comprise the error resilience data and this error resilience data may be a pointer to some of the preceding packets. If this packet belongs to the received packets 208, which check is performed in 320, then the resuming of the decoding is performed in 316. However, if the slice header needed belongs to the lost packets, i.e. does not belong to the received ones, then process 310 searches in step 322 for a packet with a new slice header, which step corresponds to the concatenation of steps 312 and 314, however with looking back to step 312, if the current packet does not comprise a new slice header because any "dependent tile" would also need the slice header belonging to any of the lost packets.

It should be mentioned that alternatively specific NAL units may be interspersed between the actual slice segment NAL units discussed so far, in order to carry the error resilience data.

In resuming the decoding in step 316, the video data stream decoding may be resumed after the respective run of one or more lost packets from the identified packet onwards by applying the slice header contained in any of the received packets, as identified by the error resilience data, to the decoding of the tile, the beginning of which has been identified in step 312.

Thus, the above description revealed an error resilient transport of partial slices.

The just outlined error resilience data may point to the needed slice header by indicating, for example, the packet number of the packet within which the needed slice header is positioned. This may be done by absolute value or in a relative manner, i.e. using an offset value pointing from the current packet containing the error resilience data to the packet containing the needed slice header. Alternatively, the needed packet is indexed by way of the slice address of the independent slice segment containing the slice header needed. As indicated above, all slice segments contain a slice address indicating where within picture 14 the first block coded into this slice segment is positioned within picture 14.

In order to maintain backward compatibility with other devices not able to deal/parse the error resilience data, an extension mechanism including a respective flag may be used to enable old-fashioned decoders in order to disregard/skip the error resilience data and, accordingly, discard the same.

It goes without saying, that above concept of using error resilience data manifests itself in a corresponding network device at the sending side. Such network device could be contained within the encoder of FIG. 1 or could be connected to the output thereof. This sending network device would be configured to transmit a video data stream via a transport stream of a sequence of packets, the video data stream having tiles of pictures of a video into which the pictures are partitioned, encoded thereinto along a coding order using entropy coding and spatial prediction, the tiles being encoded into the video data stream with context derivation of the entropy coding and the spatial prediction being restricted so to not cross tile boundaries of the tiles, wherein the video data stream has the tiles of the pictures of the video encoded thereinto along the coding order in units of slices with each slice either containing data of one tile only or containing two or more tiles completely, each slice starting with a slice header, wherein the network device is configured to packetize the video data stream into the sequence of packets along the coding order such that each packet carries data of merely one tile, and insert error resilience data into the packets of the sequence of packets so as to identify, for each packet of the sequence of packets not containing a slice header of the slice the respective packet carries partially, that packet preceding in the sequence of packets, which contains the slice header of the respective packet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] B. Bross, W.-J. Han, J.-R. Ohm, G. J. Sullivan, T. Wiegand (Eds.), "High Efficiency Video Coding (HEVC) text specification draft 10", JCTVC-L1003, Geneva, C H, January 2013
[2] G. Tech, K. Wegner, Y. Chen, M. Hannuksela, J. Boyce (Eds.), "MV-HEVC Draft Text 3 (ISO/IEC 23008-2 PDAM2)", JCT3V-C1004, Geneva, C H, January 2013
[3] G. Tech, K. Wegner, Y. Chen, S. Yea (Eds.), "3D-HEVC Test Model Description, draft specification", JCT3V-C1005, Geneva, C H, January 2013
[4] WILBURN, Bennett, et al. High performance imaging using large camera arrays. ACM Transactions on Graphics, 2005, 24. Jg., Nr. 3, S. 765-776.
[5] WILBURN, Bennett S., et al. Light field video camera. In: Electronic Imaging 2002. International Society for Optics and Photonics, 2001. S. 29-36.
[6] HORIMAI, Hideyoshi, et al. Full-color 3D display system with 360 degree horizontal viewing angle. In: Proc. Int. Symposium of 3D and Contents. 2010. S. 7-10.

The invention claimed is:
1. A network device comprising:
a processor;
a receiver configured to receive a sequence of packets in a data stream representing a video, wherein the video includes tiles of pictures of the video and the tiles are encoded in the data stream therein in units of slices, wherein each slice includes a slice header, wherein each slice is subdivided into a sequence of one independent slice segment comprising the slice header of the slice, followed by one or more dependent slice segments in which the slice header is absent; and an error handler configured to, using the processor:
(i) identify a lost packet in the sequence of packets,
(ii) identify a first packet after the lost packet in the sequence of packets based on error resilience data within the sequence of packets, wherein the first packet is associated with start of a first tile of the tiles and includes data of a first slice related to the first tile, and
(iii) identify, based on the error resilience data, a second packet, wherein the second packet is sequential to the first packet, of the sequence of packets, which includes the slice header of the first slice related to the first tile.

2. The network device according to claim 1, wherein the error handler is configured to check whether the second packet precedes the lost packet in the sequence of packets.

3. The network device according to claim 1, wherein tile boundaries coincide with borders between consecutive ones of the sequence of the one independent slice segment and the one or more dependent slice segments, wherein all independent and dependent slice segments comprise an address field indicating the start thereof, wherein the packet including the slice header of the slice carried by the first packet is identified further based on the address field.

4. The network device according to claim 1, wherein the error resilience data is present in a transport packet header of the first packet.

5. The network device according to claim 1, wherein the network device is configured to read the error resilience data from predetermined NAL units interspersed within the sequence of packets.

6. The network device according to claim 1, wherein the network device is configured to read the error resilience data from transport packet headers of the packets.

7. The network device according to claim 1, wherein the network device is configured to acquire from the error resilience data of a respective packet a pointer to, or an identifier of, the packet comprising the slice header of the slice carried by the respective packet.

8. The network device according to claim 1, wherein the network device is configured to acquire from the error resilience data a pointer to, or an identifier of, the packet comprising the slice header of the slice partially carried by the respective packet.

9. The network device according to claim 1, wherein the network device is a decoder configured to resume decoding the data stream after the first packet by applying the slice header to decode a tile the start of which is comprised in the first packet.

10. A method comprising:
receiving a sequence of packets in a data stream representing a video, wherein the video includes tiles of pictures of the video and the tiles are encoded in the data stream therein in units of slices encoded therein in units of slices, wherein each slice includes a slice header, wherein each slice is subdivided into a sequence of one independent slice segment comprising the slice header of the slice, followed by one or more dependent slice segments in which the slice header is absent;
identifying a lost packet in the sequence of packets;
identifying a first packet after the lost packet in the sequence of packets based on error resilience data within the sequence of packets, wherein the first packet is associated with start of a first tile of the tiles and includes data of a first slice related to the first tile; and
identify, based on the error resilience data, a second packet, wherein the second packet is sequential to the first packet, of the sequence of packets, which includes the slice header of the first slice related to the first tile.

11. The method according to claim 10, further comprising checking whether the second packet precedes the lost packet in the sequence of packets.

12. The method according to claim 10, wherein tile boundaries coincide with borders between consecutive ones of the sequence of the one independent slice segment and the one or more dependent slice segments, wherein all independent and dependent slice segments comprise an address field indicating the start thereof, wherein the packet including the slice header of the slice carried by the first packet is identified further based on the address field.

13. The method according to claim 10, wherein the error resilience data is present in a transport packet header of the first packet.

14. The method according to claim 10, further comprising reading the error resilience data from predetermined NAL units interspersed within the sequence of packets.

15. The method according to claim 10, further comprising reading the error resilience data from transport packet headers of the packets.

16. The method according to claim 10, further comprising acquiring from the error resilience data of a respective packet a pointer to, or an identifier of, the packet comprising the slice header of the slice carried by the respective packet.

17. The method according to claim 10, further comprising resuming decoding the data stream after the first packet by applying the slice header to decode a tile the start of which is comprised in the first packet.

* * * * *